(12) United States Patent
Li et al.

(10) Patent No.: US 9,039,558 B2
(45) Date of Patent: May 26, 2015

(54) ELECTRIC VEHICLE DRIVING SYSTEM

(75) Inventors: Feng Li, Beijing (CN); Xingquan Qin, Beijing (CN); Yu Li, Beijing (CN); Bao Li, Beijing (CN); Yanqiao Zhang, Beijing (CN); Qiang He, Beijing (CN)

(73) Assignees: BEIQI FOTON MOTOR CO., LTD., Beijing (CN); BEIJING ZHI KE INVESTMENT AND MANAGEMENT CO., LTD., Beijing (CN)

( * ) Notice: Subject to any disclaimer, the term of this patent is extended or adjusted under 35 U.S.C. 154(b) by 259 days.

(21) Appl. No.: 13/697,999

(22) PCT Filed: Mar. 11, 2011

(86) PCT No.: PCT/CN2011/071712
§ 371 (c)(1),
(2), (4) Date: Feb. 1, 2013

(87) PCT Pub. No.: WO2011/140857
PCT Pub. Date: Nov. 17, 2011

(65) Prior Publication Data
US 2013/0130856 A1 May 23, 2013

(30) Foreign Application Priority Data

May 14, 2010 (CN) .......................... 2010 1 0175807
Aug. 4, 2010 (CN) .......................... 2010 1 0245479

(51) Int. Cl.
*B60K 17/12* (2006.01)
*F16H 37/08* (2006.01)
(Continued)

(52) U.S. Cl.
CPC *F16H 37/08* (2013.01); *B60K 1/02* (2013.01); *B60K 17/12* (2013.01); *Y02T 10/642* (2013.01);
(Continued)

(58) Field of Classification Search
CPC ........ B60K 1/02; B60K 17/12; B60K 17/356; F16H 37/08; B60L 11/14; B60L 11/123; B60L 15/2045
USPC ................................... 475/151, 5; 477/15, 20
See application file for complete search history.

(56) References Cited

U.S. PATENT DOCUMENTS 3,161,083 A * 12/1964 Roe .................................. 475/5
5,080,635 A * 1/1992 Martinez et al. .................. 475/5
(Continued)

FOREIGN PATENT DOCUMENTS

| CN | 1521033 | 8/2004 |
|---|---|---|
| CN | 1660622 | 8/2005 |

(Continued)

*Primary Examiner* — Sherry Estremsky
(74) *Attorney, Agent, or Firm* — Volpe and Koenig, P.C.

(57) ABSTRACT

An electric vehicle driving system includes an energy-storage apparatus (1), a first motor (2), a speed regulating motor (3) and a single row planetary mechanism. Said first motor (2) and said speed regulating motor (3) are connected electrically to the energy-storage apparatus (1). The single row planetary mechanism includes a sun gear (4), a gear ring (5) and a planetary carries (6) with planetary gears (7). The planetary gears (7) in the planetary carrier (6) mesh the gear ring (5) and the sun gear (4) separately. The output axle of the first motor (2) is connected to the gear ring (5), and the output axle of the speed regulating motor (3) is connected to the sun gear (4) by a brake (8). The invention takes the speed regulating motor and the single row planetary mechanism instead of the gearbox in a transmission driving system, and achieves a simple and compact structure, easy assemble, light weight, and low manufacturing cost. With the speed regulation of the speed regulating motor, the first motor works in high efficiency speed range, which increases energy utilization rate and endurance mileage.

14 Claims, 3 Drawing Sheets

(51) Int. Cl.
*B60K 1/02* (2006.01)
*B60L 11/12* (2006.01)
*B60L 11/14* (2006.01)
*B60L 15/20* (2006.01)
*B60K 17/356* (2006.01)
*B60K 7/00* (2006.01)

(52) U.S. Cl.
CPC ............... *B60L 11/123* (2013.01); *B60L 11/14* (2013.01); *B60L 15/2045* (2013.01); *B60L 2210/10* (2013.01); *B60L 2240/421* (2013.01); *B60L 2240/423* (2013.01); *Y02T 10/7077* (2013.01); *Y02T 10/7216* (2013.01); *Y02T 10/6217* (2013.01); *Y02T 10/70* (2013.01); *B60K 7/0007* (2013.01); *B60K 17/356* (2013.01); *B60K 2007/0092* (2013.01); *B60Y 2400/61* (2013.01); *Y02T 10/7283* (2013.01)

(56) References Cited

U.S. PATENT DOCUMENTS

| | | | |
|---|---|---|---|
| 5,087,230 A * | 2/1992 | Yates et al. | 475/151 |
| 7,004,869 B2 | 2/2006 | Porter | |
| 7,568,537 B2 | 8/2009 | King | |
| 7,584,813 B2 | 9/2009 | Yoshida | |
| 7,980,349 B2 | 7/2011 | Sato | |
| 8,591,370 B2 * | 11/2013 | Yang | 475/156 |
| 2008/0189002 A1 | 8/2008 | Egoshi | |
| 2008/0223640 A1 * | 9/2008 | Clauson | 180/69.6 |
| 2009/0152071 A1 | 6/2009 | Jeon | |
| 2010/0222953 A1 * | 9/2010 | Tang | 701/22 |
| 2012/0190491 A1 * | 7/2012 | Gunji et al. | 475/5 |
| 2013/0006460 A1 * | 1/2013 | Endo et al. | 701/22 |

FOREIGN PATENT DOCUMENTS

| | | |
|---|---|---|
| CN | 1772530 | 5/2006 |
| CN | 101456355 | 6/2009 |
| CN | 101844511 | 9/2010 |
| JP | 2006136143 A2 | 5/2006 |
| JP | 2007068301 A2 | 3/2007 |
| JP | 2008195320 A2 | 8/2008 |
| JP | 2008302892 A2 | 12/2008 |
| JP | 2009523002 T2 | 6/2009 |
| JP | 2009144908 A2 | 7/2009 |

* cited by examiner

ELECTRIC VEHICLE DRIVING SYSTEM

This application is a 35 U.S.C. §371 national phase application of PCT/CN2011/071712, which was filed Mar. 11, 2011 and is incorporated herein by reference as if fully set forth.

FIELD OF THE INVENTION

The present invention relates to a vehicle driving system, particularly to an electric vehicle driving system.

BACKGROUND OF THE INVENTION

At present, due to the environmental pollution of fuel-powered vehicles and the continuous hike of international oil price, pure electric vehicle (PEV) as a branch of green new energy technology has such advantages as zero emission, low noise, simple structure and realization of diversified transport energy and gradually attracts people's attraction and its market share increases year by year. Nonetheless, PEV still has much to be desired. The driving mechanism for PEV at present still adopts the motor+gearbox model, but the gearbox has the defects of complex structure, difficult assembly, large weight and high manufacturing cost and greatly increases the production cost of the vehicle. Further, due to limited electric quantity of batteries and limited power of motors, conventional PEV also has the outstanding drawbacks of short mileage and poor power performance, which have become main bottlenecks to the popularization of PEV.

SUMMARY OF THE INVENTION

To address the above technical problem, the object of the present invention is to provide an electric vehicle driving system, which has the advantages of simple structure, easy assembly, low manufacturing cost and high performance in power and endurance.

In order to realize the foregoing object, the present invention provides an electric vehicle driving system, which includes: an energy-storage device, a first motor electrically connected to the energy-storage device, a speed regulating motor electrically connected to the energy-storage device, and a single row planetary gear mechanism, which includes a sun gear, a gear ring and a planetary carrier with planetary gears. The planetary gears on the planetary carrier individually mesh the gear ring and the sun gear. The output axle of the first motor is connected to the gear ring. The output axle of the speed regulating motor is connected to the sun gear by a brake.

The beneficial effect of the vehicle power output device of the present invention is: to take a speed regulating motor+a single row planetary gear mechanism instead of a gearbox in a conventional driving system, and achieve a simple and compact structure, easy assembly, small weight and low manufacturing cost of the whole power assembly. Further, with the speed regulation of the speed regulating motor, the first motor works in a high-efficiency speed range, which increases energy utilization rate and endurance mileage.

DETAILED DESCRIPTION OF THE EMBODIMENTS

The present invention will now be described by referring to the accompanying drawings, from which its foregoing and/or other objects, features and advantages will be evident. Further, in the specification of the present invention, same components are expressed with same signs. It should be noted that in FIG. 1-FIG. 5, dotted lines denote electrical connection and solid lines denote mechanical connection.

Figure 1:
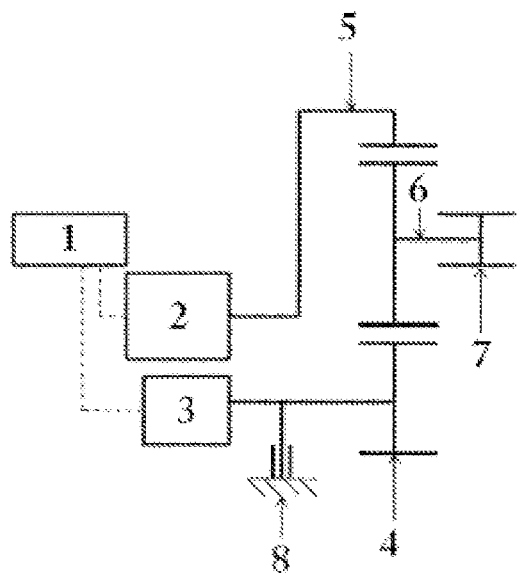
FIG. 1 is a structural schematic of an electric vehicle driving system provided by the present invention.

FIG. 1 is a structural schematic of an electric vehicle driving system provided by the present invention. As shown in FIG. 1, the present invention provides an electric vehicle driving system, which includes: an energy-storage device 1, a first motor 2 electrically connected to the energy-storage device 1, a speed regulating motor 3 electrically connected to the energy-storage device 1, and a single row planetary gear mechanism, which includes a sun gear 4, a gear ring 5 and a planetary carrier 6 with planetary gears 7. The planetary gears 7 on the planetary carrier 6 individually mesh the gear ring 5 and the sun gear 4. The output axle of the first motor 2 is connected to the gear ring 5. The output axle of the speed regulating motor 3 is connected to the sun gear 4 by a brake 8.

Wherein, in comparison with the first motor 2, the speed regulating motor 3 may be a high-speed small-power motor and the first motor 2 may adopt a permanent magnet synchronous motor or a permanent magnet brushless motor typically used on an electric vehicle. The brake 8 is used to lock the connection between the speed regulating motor 3 and the sun gear 4 and prevent the transmission of mechanical energy between them. The brake 8 may be any brake that can realize a braking effect.

Figure 2:
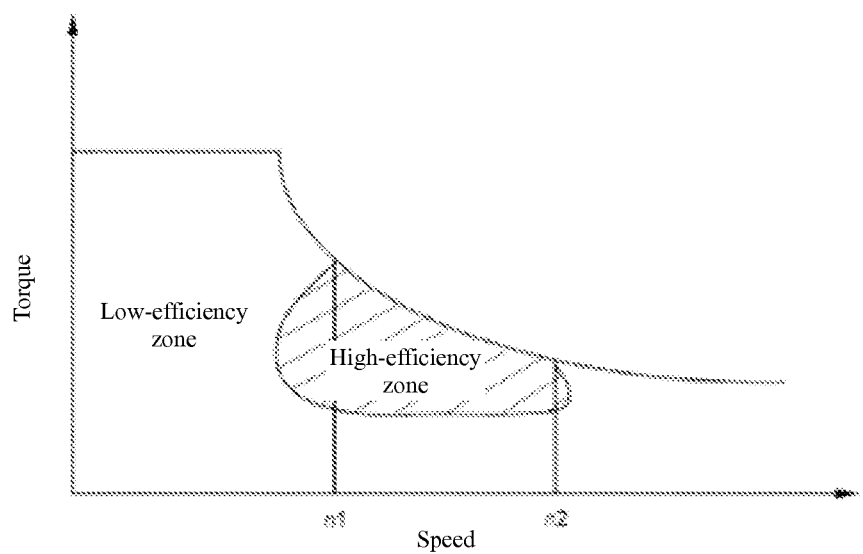
FIG. 2 is a drawing for efficiency characteristics of the first motor.

As known in the art, every motor has a high efficiency zone and a low efficiency zone. FIG. 2 is a drawing for efficiency characteristics of the first motor 2. When the first motor 2 works in the low efficiency zone, the speed regulating motor 3 may, through driving the sun gear 4, maximally ensure the first motor 2 connected to the gear ring 5 works at a speed interval of n1-n2 corresponding to the high efficiency zone, hereby increasing energy utilization rate and endurance mileage of the electric vehicle.

Figure 3:
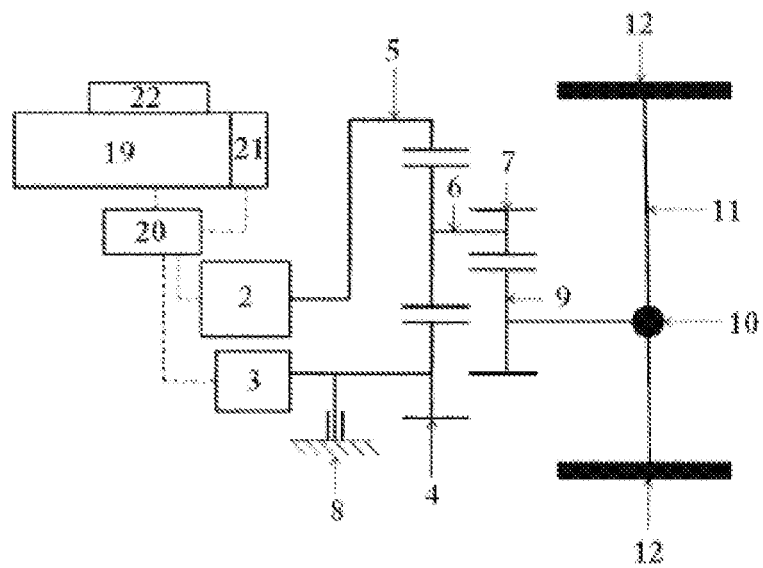
FIG. 3 is a structural schematic of an electric vehicle driving system according to embodiment 1 of the present invention.

FIG. 3 is a structural schematic of an electric vehicle driving system according to embodiment 1 of the present invention. As shown in FIG. 3, the electric vehicle driving system also comprises: a main decelerator 9, which meshes the output gear of the planetary carrier 6, and a front axle differential 10, which is disposed on the output axle 11 of the front axle and connected to the main decelerator 9 to output the power transmitted by the main decelerator 9 via the front axle differential 10 to the output axle 11 of the front axle. Here a front wheel driving system for electric vehicle is formed. The sign "12" in FIG. 3 stands for the wheels mounted on the output axle 11 of the front axle.

Preferably, the electric vehicle driving system may also comprise a controller, which is electrically connected to the first motor 2, the speed regulating motor 3 and the brake 8 and is configured to carry out the following operations according to the operating modes of the electric vehicle. Below the operations in relation to the controller are described in details:

The start of EV typically includes: level-ground start and hill start. In the former case, the driver only needs to step on the accelerator gently. In the latter case, the driver needs to step on the accelerator deeply.

In the condition of the electric vehicle is in an operating mode of level-ground start, the controller ensures the first motor 2 is started and in an operating mode of motor drive, the speed regulating motor is shut down and the brake 8 is locked. Under this circumstance, the locking of the brake 8 may fix the sun gear 4 in the single row planetary gear mechanism, thereby only the first motor 2 drives the rotation of the gear ring 5, the first motor 2 and the starting vehicle speed have a fixed proportional relation, making for control (equivalent to the first gear when the vehicle is started by using a gearbox), the gear ring 5 makes the planetary carrier 6 rotate by meshing with it, and the planetary carrier 6 drives the main decelerator 9 and the front axle differential 10 to transmit the power that meets the demand to the output axle 11 of the front axle, thereby driving the wheels to rotate and drive the vehicle.

In the condition of the electric vehicle is in an operating mode of hill start, the controller ensures the first motor 2 and the speed regulating motor 3 are started and in an operating mode of motor drive, and the brake 8 is not locked. At the moment, the power of the electric vehicle is jointly provided by the first motor 2 and the speed regulating motor 3, thereby adapting to the drivers' driving mode of stepping on the accelerator deeply.

In the condition of the electric vehicle is in an operating mode of cruising, the controller ensures the first motor 2 and the speed regulating motor 3 are started and in an operating mode of motor drive and the brake 8 is not locked. As the rotation speeds of the components in the single row planetary gear mechanism have fixed proportional relations, i.e.: $(1+g_{RS})\omega_c = \omega_S + g_{RS}\omega_R$ ($g_{RS}$ is the gear ratio between the gear ring 5 and the sun gear 4, $\omega_c$ is the rotation speed of the planetary carrier 6, $\omega_S$ is the rotation speed of the sun gear 4, and $\omega_R$ is the rotation speed of the gear ring 5), the speed of the first motor 2 may be regulated by the speed regulating motor 3 to ensure the first motor 2 is in the high-efficiency speed range, the [n1, n2] speed range as shown in FIG. 2 (i.e.: the speed range of the high efficiency zone, which varies with motors, [2000, 2200] for example) and the first motor 2 has a high efficiency, which increases endurance mileage of the electric vehicle.

In the condition of the electric vehicle is in an operating mode of quick acceleration, climbing or bad road condition, the controller ensures the first motor 2 and the speed regulating motor 3 are started and in an operating mode of motor drive, and the brake 8 is not locked. At the moment, the electric vehicle needs a high power and the power is jointly provided by the first motor 2 and the speed regulating motor 3 to meet the torque demand of the electric vehicle.

In the condition of the electric vehicle is in an operating mode of deceleration or braking, the controller ensures the first motor 2 is started and in an operating mode of power generation, the speed regulating motor 3 is shut down and the brake 8 is locked. At the moment, the mechanical energy of the output axle 11 of the front axle drives the first motor 2 to rotate, thereby the first motor 2 transmits the generated electrical energy to the energy-storage device 1. At the moment, the locking of the brake 8 may prevent the mechanical energy of the output axle 11 of the front axle from driving the idling of the speed regulating motor 3, thereby the mechanical energy is maximally used to drive the rotation of the first motor 2 to generate more electrical energy.

In the condition of the electric vehicle is in an operating mode of stopping at traffic jam or traffic lights, the controller ensures the first motor 2 and the speed regulating motor 3 are shut down and the brake 8 is not locked. This enables the electric vehicle to have a desirable start/shutdown function and complete start in a very short time.

Wherein, the controller may judge all the operating modes based on the signals obtained from the steering wheel, brake, accelerator pedal and sensors of the electric vehicle (such as speed sensor, engine speed sensor and motor speed sensor) and perform the above control according to the actual operating modes. How to judge operating modes from the signals obtained from the sensors may be set by those of ordinary skill in the art according to the actual operating condition of the vehicle and the common knowledge in the art. It is not the focus of the present invention and is not described further here.

Figure 4:
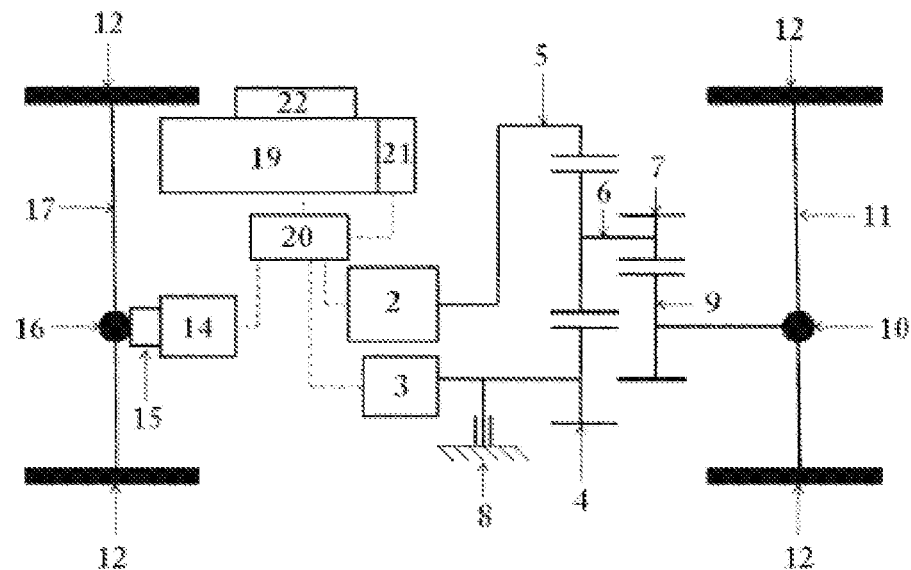
FIG. 4 is a structural schematic of an electric vehicle driving system according to embodiment 2 of the present invention.

FIG. 4 is a structural schematic of an electric vehicle driving system according to embodiment 2 of the present invention. As shown in FIG. 4, the electric vehicle driving system may also comprise: a second motor 14 electrically connected to the energy-storage device 1, a rear axle decelerator 15 connected to the output axle of the second motor 14, and a rear axle differential 16, which is disposed on the output axle 17 of the rear axle and connected to the rear axle decelerator 15 to output the power of the rear axle decelerator 15 transmitted via the rear axle differential 16 to the output axle 17 of the rear axle. Here a front and rear-wheel driving system for the electric vehicle is formed. The sign "12" in FIG. 4 stands for the wheels mounted on the output axle 11 of the front axle and the output axle 17 of the rear axle.

Preferably, the electric vehicle driving system also comprises a controller, which is electrically connected to the first motor 2, the second motor 14, the speed regulating motor 3 and the brake 8 and may be configured to carry out the following operations according to the operating modes of the electric vehicle. Below the operations in relation to the controller are described in details:

In the condition of the electric vehicle is in an operating mode of level-ground start, the controller ensures the first motor 2 is started and in an operating mode of motor drive, the speed regulating motor 3 and the second motor 14 are shut down and the brake 8 is locked. At the moment, as the power demand of the electric vehicle is not high, the vehicle may be driven in form of front-wheel drive. Under this circumstance, the locking of the brake 8 may fix the sun gear 4 in the single row planetary gear mechanism, thereby only the first motor 2 drives the rotation of the gear ring 5, the first motor 2 and the starting vehicle speed have a fixed proportional relation, making for control (equivalent to the first gear when the vehicle is started by using a gearbox), the gear ring 5 makes the planetary carrier 6 rotate by meshing with it, and the planetary carrier 6 drives the main decelerator 9 and the front axle differential 10 to transmit the power that meets the demand to the output axle 11 of the front axle, thereby driving to the wheels to rotate and drive the vehicle.

In the condition of the electric vehicle is in an operating mode of hill start, the controller ensures the first motor 2 and the second motor 14 are started and in an operating mode of motor drive, the speed regulating motor 3 is shut down and the brake 8 is locked. At the moment, the power of EV is jointly provided by the first motor 2 and the second motor 14, and the vehicle is started in form of four-wheel drive, thereby adapting to the drivers' driving mode of stepping on the accelerator deeply.

In the condition of the electric vehicle is in an operating mode of cruising, the controller ensures the first motor 2 and the speed regulating motor 3 are started and in an operating mode of motor drive, the second motor 14 is shut down and the brake 8 is not locked. At the moment, as the power demand of the electric vehicle is not high, the vehicle may be driven by the first motor 2 and the speed regulating motor 3 in form of front-wheel drive and the speed of the first motor 2 may be regulated by the speed regulating motor 3 to ensure the first motor 2 is in the high-efficiency speed range.

In the condition of the electric vehicle is in an operating mode of quick acceleration, climbing or bad road condition, the controller ensures the first motor 2, the second motor 14 and the speed regulating motor 3 are started and in an operating mode of motor drive, and the brake 8 is not locked. At the moment, the electric vehicle needs a high power and the three jointly provides power to the electric vehicle.

In the condition of the electric vehicle is in an operating mode of deceleration or braking, the controller ensures the first motor 2 is started and in an operating mode of power generation, the speed regulating motor 3 and the second motor 14 are shut down and the brake 8 is locked.

In the condition of the electric vehicle is in an operating mode of stopping at traffic jam or traffic lights, the controller ensures the first motor 2, the second motor 14 and the speed regulating motor 3 are shut down and the brake 8 is not locked. This enables the electric vehicle to have a desirable start/shutdown function and complete start in a very short time.

Comparing with embodiment 1, this embodiment adds rear-wheel drive and possesses the advantages of a four-wheel drive system, mainly in the following four aspects:

(1) Under normal driving condition (the road is flat and can provide sufficient adhesion), a four-wheel drive system may provide impressive power performance.

(2) When the vehicle runs at a high speed, wind resistance increases. A four-wheel drive system may enhance running stability.

(3) Front-wheel drive may have the problem of understeering when the vehicle negotiates a turn in an accelerated manner, and rear-wheel drive may have the problem of oversteering when the vehicle negotiates a turn in an accelerated manner, while a four-wheel drive system may distribute driving power to the front and rear wheels according to the running state of the vehicle, thus significantly improving the steering performance of the vehicle.

(4) Under the conditions of countryside and muddy roads and slippery roads in snowy days, when the front wheels skid, the four-wheel drive system may reduce torque output of the front wheels and initiate the torque output of the rear axle motor; when the rear wheels skid, it may reduce the torque output of the rear axle motor and adopt the drive of front axle motor. Thereby, vehicle skidding may be prevented and the passing capacity of the vehicle may be improved.

As for how the controller controls the first motor 2 and the second motor 14 to realize the above advantages, please refer to the control methods of conventional four-wheel drive systems, which have constituted prior art, so will not be further described here.

Figure 5:
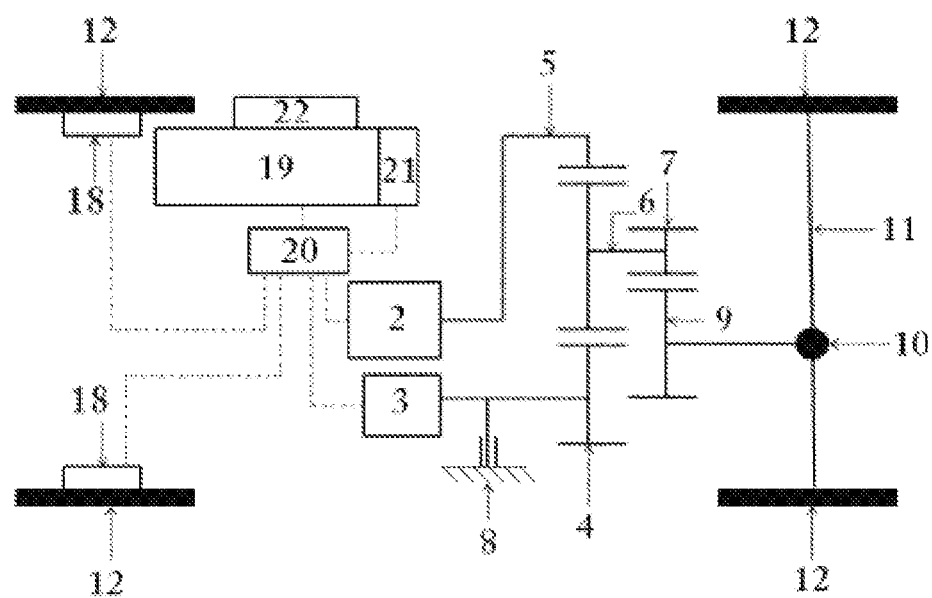
FIG. 5 is a structural schematic of an electric vehicle driving system according to embodiment 3 of the present invention.

FIG. 5 is a structural schematic of an electric vehicle driving system according to embodiment 3 of the present invention. As shown in FIG. 5, the electric vehicle driving system may also comprise: two hub motors 18, which are on the two rear wheels 12 of the vehicle, electrically connected to the energy-storage device 1 and used to directly drive the rear wheels 12. Here a front and rear-wheel driving system of the electric vehicle is formed. Its difference from the front and rear-wheel driving system in embodiment 2 is that it does not include the output axle of the rear axle, the rear axle decelerator 15 and the rear axle differential 16 located on the output axle of the rear axle, and the two rear wheels 12 are independently driven by two hub motors 18.

Preferably, the electric vehicle driving system also comprises a controller, which is electrically connected to the first motor 2, the two hub motors 18, the speed regulating motor 3 and the brake 8 and may be configured to carry out the following operations according to the operating modes of the electric vehicle. Below the operations in relation to the controller are described in details:

In the condition of the electric vehicle is in an operating mode of level-ground start, the controller ensures the first motor 2 is started and in an operating mode of motor drive, the speed regulating motor 3 and the two hub motors 18 are shut down and the brake 8 is locked. At the moment, as the power demand of the electric vehicle is not high, the vehicle may be driven in form of front-wheel drive. Under this circumstance, the locking of the brake 8 may fix the sun gear 4 in the single row planetary gear mechanism, thereby only the first motor 2 drives the rotation of the gear ring 5, the first motor 2 and the starting vehicle speed have a fixed proportional relation, making for control (equivalent to the first gear when the vehicle is started by using a gearbox), the gear ring 5 makes the planetary carrier 6 rotate by meshing with it, and the planetary carrier 6 drives the main decelerator 9 and the front axle differential 10 to transmit the power that meets the demand to the output axle 11 of the front axle, thereby driving the wheels to rotate and drive the vehicle.

In the condition of the electric vehicle is in an operating mode of hill start, the controller ensures the first motor 2 and the two hub motors 18 are started and in an operating mode of motor drive, the speed regulating motor 3 is shut down and the brake 8 is locked. At the moment, the power of the electric vehicle is jointly provided by the first motor 2 and the two hub motors 18, thereby adapting to the drivers' driving mode of stepping on the accelerator deeply.

In the condition of the electric vehicle is in an operating mode of cruising, the controller ensures the first motor 2 and the speed regulating motor 3 are started and in an operating mode of motor drive, the two hub motors 18 is shut down and the brake 8 is not locked. At the moment, as the power demand of the electric vehicle is not high, the vehicle may be driven by the first motor 2 and the speed regulating motor 3 in form of front-wheel drive and the speed of the first motor 2 may be regulated by the speed regulating motor 3 to ensure the first motor 2 is in the high-efficiency speed range.

In the condition of the electric vehicle is in an operating mode of quick acceleration, climbing or bad road condition, the controller ensures the first motor 2, the two hub motors 18 and the speed regulating motor 3 are started and in an operating mode of motor drive, and the brake 8 is not locked. At the moment, the electric vehicle needs a high power and the four jointly provides power to the electric vehicle to meet the torque demand of the electric vehicle.

In the condition of the electric vehicle is in an operating mode of deceleration or braking, the controller ensures the first motor 2 is started and in an operating mode of power generation, the speed regulating motor 3 and the two hub motors 18 are shut down and the brake 8 is locked.

In the condition of the electric vehicle is in an operating mode of stopping at traffic jam or traffic lights, the controller ensures the first motor 2, the two hub motors 18 and the speed regulating motor 3 are shut down and the brake 8 is not locked. This enables the electric vehicle to have a desirable start/shutdown function and complete start in a very short time.

Comparing with embodiment 2, this embodiment adopts two independent hub motors 18 to drive the two rear wheels, so it has the following advantages on the basis of the advantages of embodiment 2:

(1) Braking may be realized by providing a braking torque to the hub motors 18, thereby ABS, ESP and other braking devices used on a conventional electric vehicle may be saved.

(2) In case of understeering or oversteering, the stability of the vehicle may be realized by providing a braking torque or a driving torque from the hub motors 18, thereby realizing a function similar to ESP.

As for how the controller controls the hub motors 18 to realize the above advantages, please refer to the control methods of conventional four-wheel drive and/or four-wheel individual drive systems, which have constituted prior art, so will not be further described here.

In the electric vehicle driving system according to the foregoing three embodiments, if one or a few of the motors are faulty, the controller may shut down the faulty motors and use other motors to drive the electric vehicle home or to a garage for repair. Failures may be detected by various methods. For example, the controller may calculate in real time the difference between the real speed and the expected speed. If this difference of a motor exceeds the preset value (for example, 150-600 rpm) in a long time, then it may be concluded that the motor is faulty. In respect to the first motor 2, its expected speed is the speed zone corresponding to its high efficiency zone (as shown in FIG. 2); in respect to the speed regulating motor 3, its expected speed and the expected speed of the first motor have a fixed proportional relation. This proportion is decided by the single row planetary gear mechanism. It should be noted that the "motors" mentioned herein refer to the machines converting mechanical energy into electrical energy and/or electrical energy into mechanical energy. In the foregoing embodiments, the first motor 1 is a motor with the mode of power generation and the mode of motor drive, while other motors only have the mode of motor drive. Nevertheless, the present invention is not limited to this, the first motor 1 may also be a motor only with the mode of motor drive (in this case, the function of reversely charging the energy-storage device 1 during braking of the electric vehicle is deleted), and other motors may also be motors with both the mode of power generation and the mode of motor drive (if necessary, the function of reversely charging the energy-storage device 1 during braking of the electric vehicle may also be realized).

Below the specific embodiments of the energy-storage device 1 are described by referring to FIG. 3-FIG. 5. The energy-storage device 1 may comprise: a battery 19, and a DC/DC converter 20, which is electrically connected to the battery 19 and is used to perform DC/DC conversion to the output from and/or input into the battery 19. The DC/DC converter 20 may perform voltage increase or voltage decrease conversion to the electrical energy output from the battery 19 to satisfy the power consumption demand of the whole electric vehicle. For example, in respect to high-voltage devices like the first motor 2, the speed regulating motor 3, the second motor 14 and the hub motors 18, the DC/DC converter 20 needs to raise the voltage of the electrical energy output from the battery 19 and provide the electrical energy to these high-voltage devices after voltage increase to meet their operating requirements. The battery 19 may be a lithium iron phosphate or lithium manganate battery.

Preferably, the energy-storage device 1 may also comprise a capacitor 21, which is disposed between the DC/DC converter 20 and the battery 19, and used to protect the battery 19 from the entry of large pulse current during charging of the battery 19 as a result of braking of the electric vehicle. Small capacity of the capacitor 21 will impair battery 19's electrical energy recovery effect during braking, while large capacity may result in high cost, so the preferred capacity is 1500~1600 F.

Preferably, the energy-storage device 1 may also comprise a battery management system 22, which is electrically connected to the battery 19 and used to manage the charging, discharging and balancing of the battery 19, thereby lengthening the service life of the battery 19.

The present invention is a technical solution designed according to the technical indicators of PEV by analyzing the features of domestic and foreign electric vehicles and comprehensively considering the requirements on power, economy and overall cost. It abandons the gearbox in a conventional structure and adopts a speed regulating motor 3 and a single row planetary gear mechanism. As a result, the power assembly is characterized by a simple and compact structure, easy assembly, small weight and low manufacturing cost, the speed regulating range of the first motor 2 is widened and the energy utilization rate and endurance mileage are increased.

Further, the electric vehicle driving system provided by the present invention may select different driving methods: front-wheel drive, rear-wheel drive and four-wheel drive, according to the operating modes. When the electric vehicle adopts front-wheel drive, the speed regulating motor 3 may regulate the speed of the first motor 2 to ensure the first motor 2 works in a speed range of the highest efficiency and the vehicle can achieve the maximum driving mileage of the battery 19. Under the operating conditions of start, overtaking, acceleration and climbing, the four-wheel drive method may be adopted to provide the best power performance. If the first motor 2 for front-wheel drive is faulty, the second motor 14 or the hub motor may be activated to adopt the rear-wheel drive method. During deceleration or braking, the brake 8 between the speed regulating motor 3 and the sun gear 4 is locked, the first motor 2 serves as a generator and charges the capacitor 21, and the battery 19 is charged only after the capacitor 21 is fully charged, thereby reducing the harm to the battery 19 from large instant current and lengthening the service life of the battery 19.

Although the present invention has been disclosed through the foregoing embodiments, the foregoing embodiments are not intended to limit the present invention. Various changes and modifications may be made to the embodiments without departing from the spirit of the invention by those skilled in the art. Therefore, the scope of the invention is to be limited only by the appended claims.

What is claimed is:

1. An electric vehicle driving system, comprising:
   an energy-storage device;
   a first motor electrically connected to the energy-storage device;
   a speed regulating motor electrically connected to the energy-storage device; and
   a single row planetary gear mechanism, which comprises a sun gear, a gear ring and a planetary carrier with planetary gear gears, wherein the planetary gear gears on the planetary carrier individually mesh with the gear ring and the sun gear, an output axle of the first motor is connected to the gear ring, and an output axle of the speed regulating motor is connected to the sun gear and a brake,
   wherein the system further comprises:
   a main decelerator, which meshes with an output gear of the planetary carrier; and a front axle differential, which is disposed on an output axle of a front axle and connected to the main decelerator to output the power transmitted by the main decelerator via the front axle differential to the output axle of the front axle.

2. The electric vehicle driving system according to claim 1, wherein the speed regulating motor has a higher speed and a smaller power than the first motor does.

3. The electric vehicle driving system according to claim 1, wherein the system further comprises a controller, which is electrically connected to the first motor, the speed regulating motor and the brake, and is configured to carry out at least one of the following operations:
   in the condition of the electric vehicle is in an operating mode of level-ground start, the controller ensures the first motor is started and in an operating mode of motor drive, the speed regulating motor is shut down and the brake is locked;
   in the condition of the electric vehicle is in an operating modes of hill start, cruising, quick acceleration, climbing or bad road condition, the controller ensures the first motor and the speed regulating motor are started and in an operating mode of motor drive, and the brake is not locked;
   in the condition of the electric vehicle is in an operating mode of deceleration or braking, the controller ensures the first motor is started and in an operating mode of power generation, the speed regulating motor is shut down and the brake is locked; and
   in the condition of the electric vehicle is in an operating mode of stopping at traffic jam or traffic lights, the controller ensures the first motor and the speed regulating motor are shut down and the brake is not locked.

4. The electric vehicle driving system according to claim 3, wherein the controller is further configured to carry out the following operations:
   detecting the state of motors connected to the controller; and
   shutting down the faulty motor and driving with a motor without failure.

5. The electric vehicle driving system according to claim 1, wherein the system further comprises:
   a second motor electrically connected to the energy-storage device;
   a rear axle decelerator connected to an output axle of the second motor; and
   a rear axle differential, which is disposed on an output axle of a rear axle and connected to the rear axle decelerator to output the power of the rear axle decelerator transmitted via the rear axle differential to the output axle of the rear axle.

6. The electric vehicle driving system according to claim 5, wherein the system further comprises a controller, which is electrically connected to the first motor, the second motor, the speed regulating motor and the brake, and is configured to carry out at least one of the following operations:
   in the condition of the electric vehicle is in an operating mode of level-ground start, the controller ensures the first motor is started and in an operating mode of motor drive, the speed regulating motor and the second motor are shut down and the brake is locked;
   in the condition of the electric vehicle is in an operating mode of hill start, the controller ensures the first motor and the second motor are started and in an operating mode of motor drive, the speed regulating motor is shut down and the brake is locked;
   in the condition of the electric vehicle is in an operating mode of cruising, the controller ensures the first motor and the speed regulating motor are started and in an operating mode of motor drive, the second motor is shut down and the brake is not locked;
   in the condition of the electric vehicle is in an operating mode of quick acceleration, climbing or bad road condition, the controller ensures the first motor, the second motor and the speed regulating motor are started and in an operating mode of motor drive, and the brake is not locked;
   in the condition of the electric vehicle is in an operating mode of deceleration or braking, the controller ensures the first motor is started and in an operating mode of power generation, the speed regulating motor and the second motor are shut down and the brake is locked; and
   in the condition of the electric vehicle is in an operating mode of stopping at traffic jam or traffic lights, the controller ensures the first motor, the second motor and the speed regulating motor are shut down and the brake is not locked.

7. The electric vehicle driving system according to claim 6, wherein the controller is further configured to carry out the following operations:
   detecting the state of motors connected to the controller; and
   shutting down the faulty motor and driving with a motor without failure.

8. The electric vehicle driving system according to claim 1, wherein the system further comprises:
   two hub motors, which are on two rear wheels of the vehicle, electrically connected to the energy-storage device and used to directly drive the rear wheels.

9. The electric vehicle driving system according to claim 8, wherein the system further comprises a controller, which is electrically connected to the first motor, the two hub motors, the speed regulating motor and the brake, and is configured to carry out at least one of the following operations:
   in the condition of the electric vehicle is in an operating mode of level-ground start, the controller ensures the first motor is started and in an operating mode of motor drive, the speed regulating motor and the two hub motors are shut down and the brake is locked;
   in the condition of the electric vehicle is in an operating mode of hill start, the controller ensures the first motor and the two hub motors are started and in an operating mode of motor drive, the speed regulating motor is shut down and the brake is locked;
   in the condition of the electric vehicle is in an operating mode of cruising, the controller ensures the first motor and the speed regulating motor are started and in an operating mode of motor drive, the two hub motors is shut down and the brake is not locked;
   in the condition of the electric vehicle is in an operating mode of quick acceleration, climbing or bad road condition, the controller ensures the first motor, the two hub motors and the speed regulating motor are started and in an operating mode of motor drive, and the brake is not locked;
   in the condition of the electric vehicle is in an operating mode of deceleration or braking, the controller ensures the first motor is started and in an operating mode of power generation, the speed regulating motor and the two hub motors are shut down and the brake is locked; and
   in the condition of the electric vehicle is in an operating mode of stopping at traffic jam or traffic lights, the controller ensures the first motor, the two hub motors and the speed regulating motor are shut down and the brake is not locked.

10. The electric vehicle driving system according to claim 9, wherein the controller is further configured to carry out the following operations:
   detecting the state of motors connected to the controller; and
   shutting down the faulty motor and driving with a motor without failure.

11. The electric vehicle driving system according to claim 1, wherein the energy-storage device comprises:
   a battery; and
   a DC/DC converter, which is electrically connected to the battery and is used to perform DC/DC conversion to the output from and/or input into the battery.

12. The electric vehicle driving system according to claim 11, wherein the energy-storage device further comprises:
   a capacitor, which is disposed between the DC/DC converter and the battery.

13. The electric vehicle driving system according to claim 12, wherein the energy-storage device further comprises:
   a battery management system, which is electrically connected to the battery and used to manage the charging, discharging and balancing of the battery.

14. The electric vehicle driving system according to claim 11, wherein the energy-storage device further comprises:
   a battery management system, which is electrically connected to the battery and used to manage the charging, discharging and balancing of the battery.

* * * * *